(12) United States Patent
Zavatone

(10) Patent No.: US 8,938,685 B2
(45) Date of Patent: Jan. 20, 2015

(54) AUTOMATED GRAPHICAL USER INTERFACE DESIGN AND DEVELOPMENT SYSTEMS AND METHODS

(75) Inventor: Alex Zavatone, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 278 days.

(21) Appl. No.: 12/983,109

(22) Filed: Dec. 31, 2010

(65) Prior Publication Data
US 2012/0174000 A1 Jul. 5, 2012

(51) Int. Cl.
*G06F 3/048* (2013.01)
*G06F 9/44* (2006.01)

(52) U.S. Cl.
CPC .................................. *G06F 8/38* (2013.01)
USPC ........................ 715/763; 715/764; 715/765

(58) Field of Classification Search
CPC ............................................. G06F 8/38
USPC .................................. 715/763–765
See application file for complete search history.

(56) References Cited

U.S. PATENT DOCUMENTS

| | | | |
|---|---|---|---|
| 8,130,238 B2* | 3/2012 | Distler | 345/619 |
| 8,160,389 B2* | 4/2012 | Bissonnette et al. | 382/282 |
| 2005/0286776 A1* | 12/2005 | Bai et al. | 382/232 |
| 2008/0244424 A1* | 10/2008 | Fukuda et al. | 715/763 |
| 2008/0247660 A1* | 10/2008 | Zhang et al. | 382/254 |
| 2009/0106113 A1* | 4/2009 | Arora et al. | 705/14 |
| 2010/0021060 A1* | 1/2010 | Bissonnette et al. | 382/180 |
| 2010/0174985 A1* | 7/2010 | Levy et al. | 715/244 |
| 2010/0306651 A1* | 12/2010 | Quennesson et al. | 715/704 |
| 2011/0004830 A1* | 1/2011 | Von Kaenel et al. | 715/751 |
| 2011/0093800 A1* | 4/2011 | Gottwald et al. | 715/763 |
| 2011/0172110 A1* | 7/2011 | Merriman | 506/9 |
| 2012/0030577 A1* | 2/2012 | Akolkar et al. | 715/738 |
| 2012/0173567 A1* | 7/2012 | Zavatone et al. | 707/769 |
| 2012/0174069 A1* | 7/2012 | Zavatone | 717/124 |

* cited by examiner

*Primary Examiner* — William Titcomb

(57) ABSTRACT

An exemplary method includes a graphics export subsystem interfacing with a graphical user interface design subsystem to access data representative of a graphical user interface screen design, generating, based on the data representative of the graphical user interface screen design, abstraction data representative of the graphical user interface screen design, and generating, based on the abstraction data, computing code configured to be processed by target computing devices having different computing platforms to render graphical user interface screens in accordance with the graphical user interface screen design. In certain examples, the method may further include exporting the computing code to a distribution subsystem for access by a developer. Corresponding methods and systems are also disclosed.

22 Claims, 7 Drawing Sheets

400

| LAYERS | |
|---|---|
| ▷ Instructions – X  ~406-2 | ○ } 402-2 |
| ▷ left arrow  ~406-1 | ○ } 402-1 |
| ▷ right arrow ~404-1 | ○ |
| ▷ list slot 3 selected | ○ |
| ▷ slug up | ○ |
| ▷ slug down | ○ |
| ▷ txt header | ○ |
| ▷ header left | ○ |
| ▷ header mid - w | ○ |
| ▷ mag selected reference – X | ○ |
| ▷ mag selected | ○ |
| ▷ Live TV | ○ |
| ▷ shadow right | ○ |
| ▷ txt counter | ○ |
| ▷ mode bg right – w | ○ |
| ▷ mode bg mid – w | ○ |
| ▷ mode bg left | ○ |
| ▷ Mode bg left – H | ○ |
| ▷ video - x | ○ |

| LAYERS | |
|---|---|
| Reference document size rect | ○ | ← 502
| Instructions – X | ○ |
| left arrow | ○ |
| right arrow | ○ |
| list slot 3 selected | ○ |
| slug up | ○ |
| slug down | ○ |
| txt header | ○ |
| header left | ○ |
| header mid – w | ○ |
| mag selected reference – X | ○ |
| mag selected | ○ |
| Live TV | ○ |
| shadow right | ○ |
| txt counter | ○ |
| mode bg right – w | ○ |
| mode bg left | ○ |
| Mode bg left Shadow – H | ○ |
| video - x | ○ |

AUTOMATED GRAPHICAL USER INTERFACE DESIGN AND DEVELOPMENT SYSTEMS AND METHODS

BACKGROUND INFORMATION

Advances in computing technologies have led to a proliferation of computing devices in modern society. Myriad computing devices having various shapes, sizes, and capabilities have been made available to consumers. For example, consumers may choose from computing devices such as mobile phones, smart phones, tablet computers, e-reader devices, personal computers, media players, gaming devices, set-top-box ("STB") devices, digital video recorder ("DVR") devices, Global Positioning System ("GPS") devices, and other types of computing devices.

The proliferation of computing devices in modern society has challenged designers and developers of graphical user interfaces for the computing devices. For example, the competitive landscapes between manufacturers of computing devices, between providers of applications that run on computing devices, and between providers of services accessed through the computing devices have pushed designers and developers of graphical user interfaces to design and develop graphical user interfaces as efficiently as possible without sacrificing quality.

Unfortunately, traditional processes for design and development of graphical user interfaces have not kept pace with the demands placed on the designers and developers of the graphical user interfaces. To illustrate, in a traditional design and development process, a designer utilizes a graphical user interface design tool to design a screen layout of graphical elements to be included in a graphical user interface. Once the design is complete, the designer provides information about the screen layout of graphical elements to a developer who is responsible for producing computing code configured to be executed by a computing device to render a graphical user interface that includes the screen layout of graphical elements designed by the designer. Unfortunately, this process is typically time consuming, requires significant manual labor by the designer and the developer, and is fraught with opportunities for error. For instance, the developer typically has to use the information provided by the designer to manually produce computing code for the screen layout. The process must be repeated each time a modification is made to the screen layout.

These problems are exacerbated when a screen layout design is to be integrated into graphical user interfaces rendered by computing devices having different computing platforms. In such cases, the developer must manually produce computing code in different languages for the different computing platforms. This is especially time consuming and error prone when the different computing platforms render graphical user interfaces in accordance with different graphics rendering heuristics. For example, different computing platforms may use different reference positions (e.g., top-left corner versus bottom-left corner) for positioning graphical elements in a graphical user interface. As another example, different computing platforms may use different heuristics for rendering or positioning text in a graphical user interface.

For at least these reasons, the design and development of a screen layout for a graphical user interface, or even a simple change to a screen layout of a graphical user interface, is time consuming, labor intensive, and/or prone to error in a conventional design and development process.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 4 illustrates an ordered list of layers associated with a graphical user interface screen design according to principles described herein.

FIG. 5 illustrates a reference layer added to the list of layers shown in FIG. 4 according to principles described herein.

DETAILED DESCRIPTION OF PREFERRED EMBODIMENTS

Exemplary automated graphical user interface design and development systems and methods are described herein. The exemplary systems and methods may provide for automated design and development of a graphical user interface ("GUI") screen, including automatic generation and export of computing code configured to be processed by target computing devices having different computing platforms to render the GUI screen. Alternatively or additionally, the exemplary systems and methods may provide for automated generation and export of data representative of streamlined graphical elements that may be included in a GUI screen. In certain embodiments, exported computing code, when processed by a target computing device, may reference exported, streamlined graphical elements for rendering within a GUI screen.

The automated generation and export of computing code and/or data representative of streamlined graphical elements, as described herein, may facilitate an efficient and reliable process for design and development of a GUI screen. In some implementations, the timeline for design and development of a GUI screen may be reduced significantly compared to typical timelines for design and development of a GUI screen in accordance with conventional GUI design and development processes. Moreover, the opportunity for error may be reduced significantly compared to the opportunities for error in conventional GUI design and development processes.

Exemplary automated GUI design and development systems and methods will now be described in more detail with reference to the drawings.

Figure 1:
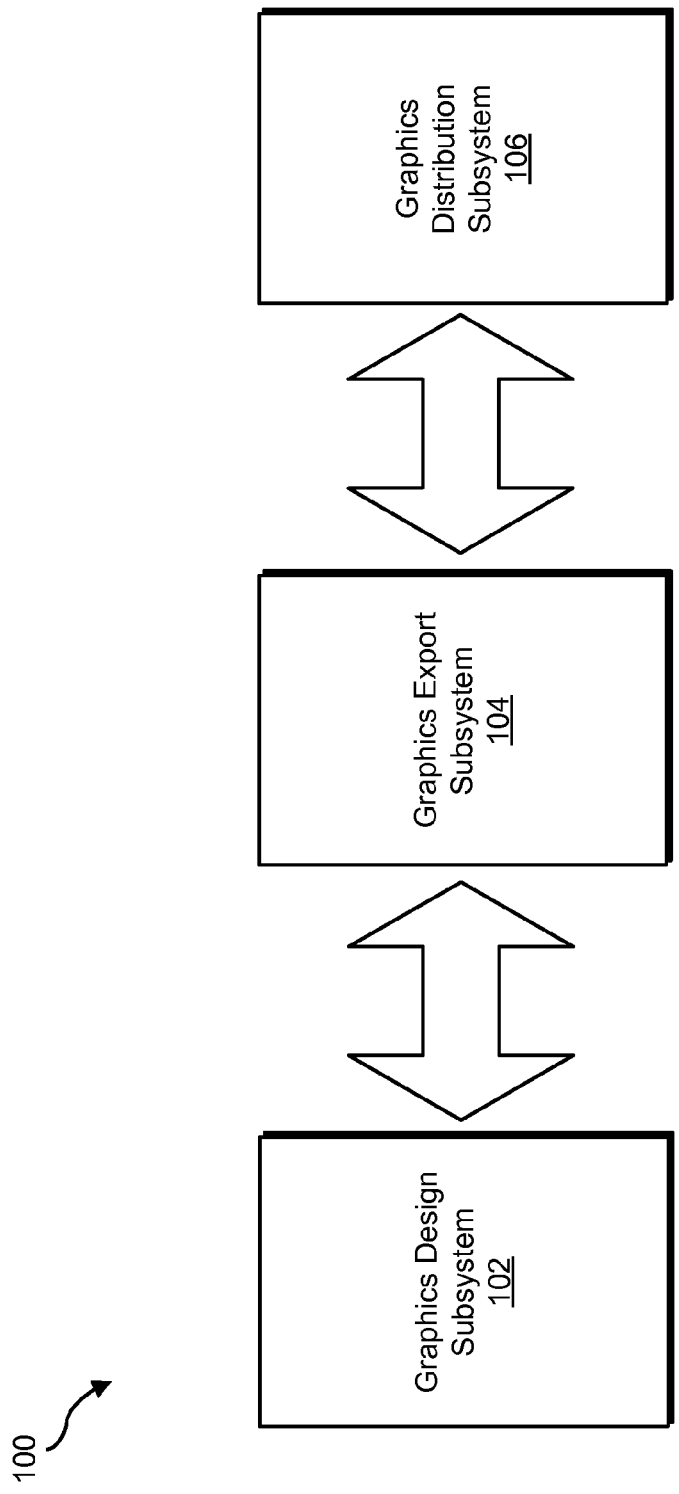
FIG. 1 illustrates an exemplary automated graphical user interface design and development system according to principles described herein.

FIG. 1 illustrates an exemplary automated GUI design and development system 100 (or simply "system 100"). As shown in FIG. 1, system 100 may include a graphics design subsystem 102 (or simply "design subsystem 102"), a graphics export subsystem 104 (or simply "export subsystem 104"), and a graphics distribution subsystem 106 (or simply "distribution subsystem 106") configured to communicate or otherwise interface with one another as shown. Each of the elements of system 100 will now be described in detail.

Design subsystem 102 may include or be implemented by one or more design tools with which a designer may interact to define a GUI screen design. In certain implementations, the tools may include one or more commercially available or proprietary GUI screen design software applications, such as Adobe Illustrator, Adobe Photoshop, and/or any other suitable GUI screen design software application(s).

Design subsystem 102 may be configured to provide a user interface through which a designer may interact with design subsystem 102 to define a GUI screen design. The user interface may be configured to visually depict the GUI screen design such that the designer may interact with the visual depiction to define and/or modify the GUI screen design.

Design subsystem 102 may be configured to maintain data representative of a GUI screen design defined by a designer. The data representative of the GUI screen design may be maintained in any suitable data format, such as a vector-based, bitmap-based, or other suitable data format.

Figure 2:
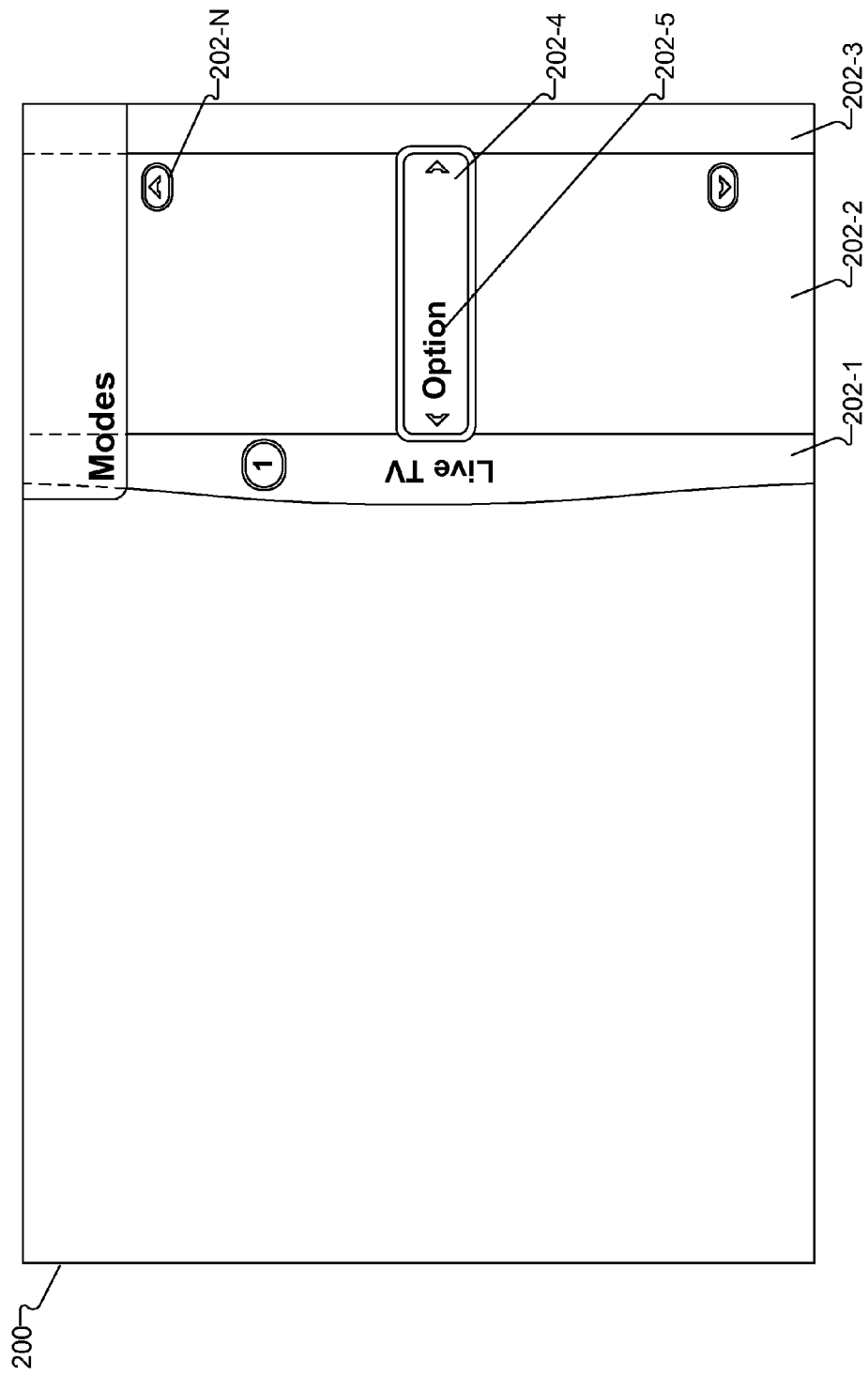
FIG. 2 illustrates a visual depiction of a graphical user interface screen design according to principles described herein.

A GUI screen design may include a visual layout of one or more graphical elements configured to be displayed within dimensions of a GUI screen. FIG. 2 illustrates a visual depiction of an exemplary GUI screen design 200. As shown, GUI screen design 200 may include one or more graphical elements, such as, but not limited to, graphical elements 202-1 through 202-N, positioned within dimensions of GUI screen design 200 to form a visual layout of the graphical elements. Graphical elements, such as graphical elements 202-1 through 202-N, may be layered in a particular order within a GUI screen design. In some examples, each graphical element may correspond to a different layer of the GUI screen design.

A graphical element may include any element that may be visually displayed within a GUI screen. For example, a graphical element may include one or more graphics, text, or a combination of text and one or more graphics that may be displayed within a GUI screen. Examples of graphical elements may include, without limitation, a scroll bar, a navigation arrow, a button, a selector, a selectable menu option, and any other graphic and/or text.

Design subsystem 102 may be configured to maintain data representative of one or more graphical elements included in a GUI screen design. Data representative of a graphical element may include an identifier for the graphical element (e.g., an element or layer name), position data indicative of a position of the graphical element within the GUI screen design, pixel data for the graphical element (e.g., pixel data specifying hue, color, saturation, transparency, brightness, and/or other attributes of one or more pixels), text data (e.g., text string, font size, letting information, alignment, and/or other text properties), and any other data descriptive of or otherwise associated with the graphical element.

Design subsystem 102 may include an interface through which export subsystem 104 may interface with design subsystem 102. Any suitable interface may be employed, such as one or more application program interfaces ("APIs").

Export subsystem 104 may be configured to interface with design subsystem 102, including interacting with design subsystem 102 to access and/or facilitate processing of data representative of a GUI screen design. Export subsystem 104 may utilize the accessed data and/or the interface with design subsystem 102 to automatically generate and export computing code configured to be processed by one or more target computing devices (e.g., target computing devices having different computing platforms) to render the GUI screen in accordance with the GUI screen design. Alternatively or additionally, export subsystem 104 may utilize the accessed data and/or the interface with design subsystem 102 to automatically generate and export data representative of one or more streamlined graphical elements representative of one or more graphical elements included in the GUI screen design. Export subsystem 104 may export the computing code and/or streamlined graphical elements to distribution subsystem 106 for access by a developer, as described below.

Figure 3:
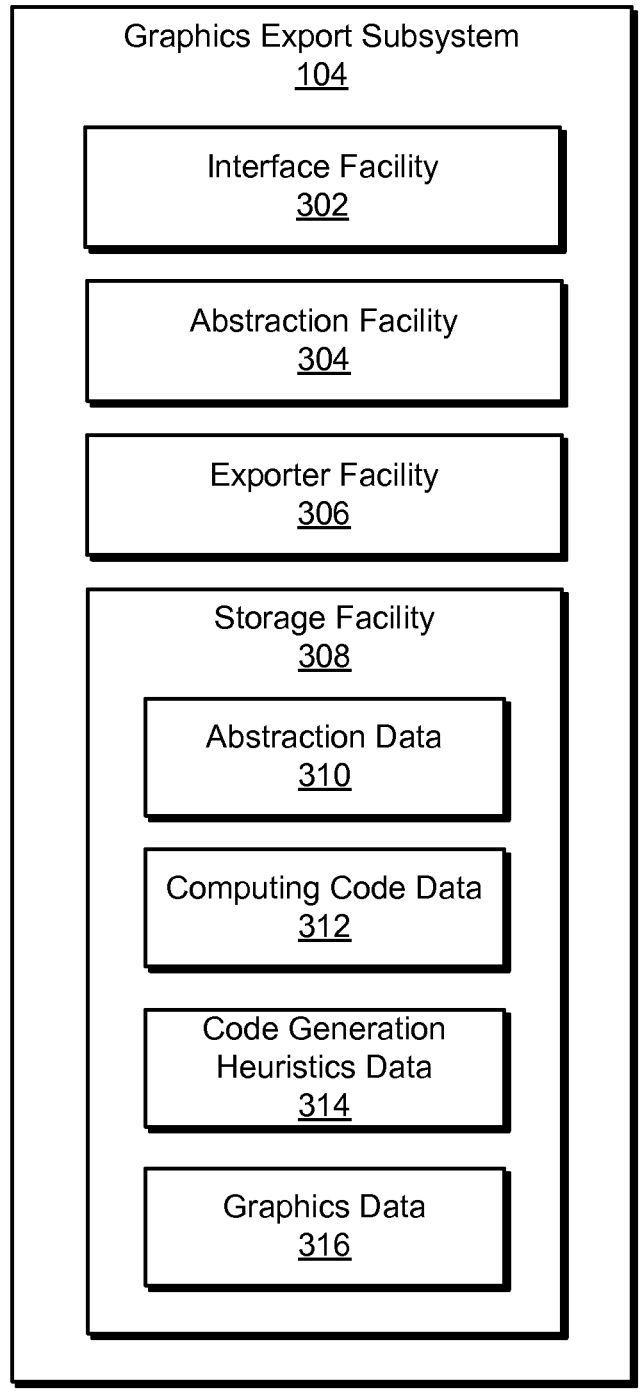
FIG. 3 illustrates exemplary components of a graphics export subsystem according to principles described herein.

FIG. 3 illustrates exemplary components of export subsystem 104. As shown, export subsystem 104 may include, without limitation, an interface facility 302, an abstraction facility 304, an exporter facility 306, and a storage facility 308, which may be in communication with one another using any suitable communication technologies. It will be recognized that although facilities 302-308 are shown to be separate facilities in FIG. 3, any of facilities 302-308 may be combined into fewer facilities, such as into a single facility, or divided into more facilities as may serve a particular implementation.

Interface facility 302 may be configured to provide an interface through which export subsystem 104 may interface with design subsystem 102. Interface facility 302 may employ any suitable technologies to provide the interface with design subsystem 102. For example, interface facility 302 may be configured to interface with one or more APIs of design subsystem 102.

Through an interface with design subsystem 102, export subsystem 104 may access data representative of a GUI screen design maintained by design subsystem 102. Additionally or alternatively, through an interface with design subsystem 102, export subsystem 104 may access and leverage one or more capabilities of design subsystem 102. For example, export subsystem 104 may instruct design subsystem 102 to perform one or more operations to process data representative of a GUI screen design and/or graphical elements included in the GUI screen design. Examples of export subsystem 104 interfacing with design subsystem 102 are described further below.

Interface facility 302 may be further configured to provide an interface through which export subsystem 104 may interface with distribution subsystem 106. Interface facility 302 may employ any suitable technologies for providing an interface with distribution subsystem 106. Through an interface with distribution subsystem 106, export subsystem 104 may export data, including computing code and/or streamlined graphical elements generated by export subsystem 104, to distribution subsystem 106 for distribution to and access by a developer.

Interface facility 302 may be further configured to provide an interface through which a user may interact with export subsystem 104. For example, a user such as a designer may provide user input to export subsystem 104 through a user interface provided by interface facility 302 to direct export subsystem 104 to perform one or more of the operations described herein. In certain implementations, for example, execution of one or more of the operations of export subsystem 104 described herein may be initiated by a user selecting an "export" option provided in a user interface.

In certain examples, interface facility 302 may be configured to interface with design subsystem 102 to leverage a user interface and/or user interface capabilities native to design subsystem 102. For example, interface facility 302 may instruct design subsystem 102 to display certain content in a user interface of design subsystem 102. The content may be representative of one or more operations performed by export subsystem 104 such that a designer may be apprised of the status of operations of export subsystem 104. For instance, the designer may be audibly and/or visually notified when one or more operations of export subsystem 104 are being performed and/or have completed.

Abstraction facility 304 may be configured to automatically generate abstraction data representative of a GUI screen design maintained by design subsystem 102. For example, through interface facility 302, export subsystem 104 may access data maintained by design subsystem 102 and representative of the GUI screen design. Abstraction facility 304 may generate abstraction data representative of the GUI screen design based on the data maintained by design subsystem 102 and accessed through interface facility 302.

Abstraction data may be defined in accordance with any data format and/or data structure that is suitable for use by exporter facility 306 to generate computing code configured to be processed by target computing devices having different computing platforms. In certain implementations, for example, abstraction data may be maintained in one or more arrays or lists (e.g. as items (e.g., one or more key/value pairs) in one or more lists or arrays).

Abstraction data may provide a level of abstraction between data maintained by design subsystem 102 and generation of computing code configured to be processed by one or more target computing devices to render a GUI screen represented by the data maintained by design subsystem 102. The level of abstraction may be leveraged to automatically generate computing code for multiple different computing platforms.

Abstraction data may include any information representative of or otherwise associated with a GUI screen design and/or one or more graphical elements included in the GUI screen designs. For example, for each graphical element included in a GUI screen design, abstraction data may include data descriptive of dimensions of the graphical element, positioning of the graphical element within the GUI screen design, (e.g., offset values from a reference position), identifier data (e.g., a name), type indicator data, (e.g., a button type element, a text field type element, etc.), and text data representative of any text properties of the graphical element.

Abstraction data may include normalized data, which may allow one or more settings that may vary in design subsystem 102 to be compensated for in the abstraction data. For example, position data included in the abstraction data may be normalized. To this end, abstraction facility 304 may be configured to normalize position data maintained by design subsystem 102. Such normalization may compensate for any differences or variations in how design subsystem 102 represents position, including by compensating for movement of and/or use of different position reference points. Such position normalization may facilitate pixel perfect positioning of graphical elements in a rendered GUI screen.

Abstraction facility 304 may be configured to normalize position data for inclusion in the abstraction data in any suitable way and using any suitable technologies. An example of how abstraction facility 304 may normalize position data is described further below.

Exporter facility 306 may be configured to automatically generate computing code configured to be processed by one or more target computing devices to generate a GUI screen in accordance with a GUI screen design. The generation of the computing code may be based on data maintained by and access from design subsystem 102 and/or abstraction data generated by abstraction facility 304 that is representative of the GUI screen design. For example, exporter facility 306 may be configured to step through and utilize abstraction data entries to generate computing code based on the abstraction data entries.

In certain embodiments, exporter facility 306 may be configured to generate computing code in multiple different languages, which may include different programming languages and/or data structures. Accordingly, the computing code may be configured to be processed by one or more target computing devices having multiple different computing platforms.

As used herein, the term "computing code" may refer to any code that may be processed by a computing device to render a GUI screen for display. As an example, computing code may include programming code such as source code, object code, or other executable code. As another example, computing code may include one or more data structures containing data representative of a GUI screen, wherein the data in the one or more data structures is configured to be parsed by a computing device to render the GUI screen. Examples of such data structures may include an Extensible Markup Language ("XML") data structure, a comma-separated value ("CSV") data structure, and any other data structure that may be parsed by a computing device to render a GUI screen.

As used herein, the term "computing platform" may refer to a computing architecture, process, and/or system configured to process a particular type or format of data, process data in a particular way, and/or perform computing operations in a particular way that is distinct from another computing platform. For example, different computing platforms may be configured to render a graphical user interface in different ways, using different data formats, and/or in accordance with different GUI rendering heuristics. To illustrate, a computing platform may use a particular reference position (e.g., a top-left position of a display screen) to render a GUI screen while another computing platform may use another reference position (e.g., a bottom-left position of a display screen) to render a GUI screen.

Exporter facility 306 may be configured to generate computing code in accordance with one or more code generation heuristics maintained in a library of code generation heuristics. Each code generation heuristic in the library may be configured to direct exporter facility 306 as to how to generate computing code configured to be processed by a target computing device having a particular computing platform. In certain embodiments, each code generation heuristic in the library may be configured to direct exporter facility 306 as to how to generate computing code based on abstraction data generated by abstraction facility 304. By generating computing code from abstraction data, exporter facility 306 may be conveniently configured to generate computing code in multiple different programming languages for multiple different computing platforms. For example, a code generation heuristic associated with a particular computing platform may be conveniently added by a user to the library of code generation heuristics to configure exporter facility 306 to generate computing code for that particular computing platform.

Additionally or alternatively, exporter facility 306 may be configured to automatically generate streamlined graphical elements representative of graphical elements included in a GUI screen design. As used herein, the term "streamlined graphical element" may refer to a graphical element from which extraneous data has been removed to make the graphical element efficient. For example, exporter facility 306 may remove extraneous data from the data representative of the graphical element that is maintained by design subsystem 102 to form a streamlined graphical element. As an example, exporter facility 306 may be configured to remove data associated with one or more transparent pixels (e.g., one hundred percent transparent pixels) from the data representative of the graphical element. As another example, exporter facility 306 may be configured to remove data associated with one or more pixels positioned outside of dimensions of the GUI screen. As yet another example, exporter facility 306 may be configured to remove data associated with one or more pixels positioned outside of dimensions of the graphical element. By removing extraneous data, exporter facility 306 may generate data representative of a streamlined graphical element.

In some examples, the generation of a streamlined graphical element may normalize the data used to represent the graphical element with data used to represent other graphical elements. This may promote efficient storage and maintenance of data representative of streamlined graphical elements. For example, normalized data representative of graphical elements may facilitate duplication detection within a repository of graphical elements.

In certain implementations, streamlined graphical elements may be configured to be referenced by computing code such that when the computing code is processed by a target computing device, the streamlined graphical elements may be accessed and used to render a GUI screen.

Exporter facility 306 may be further configured to export data representative of generated computing code, streamlined graphical elements, and/or other data generated by exporter facility 306 to distribution subsystem 106 for distribution to and access by a developer. The data may be exported to distribution subsystem 106 in any suitable way, including through an interface provided by interface facility 302. In certain implementations, data generated by exporter facility 306 may be automatically exported by export subsystem 104 to distribution subsystem 106.

Storage facility 308 may be configured to maintain abstraction data 310 (which may include any of the abstraction data described herein), computing code data 312 representative of computing code (e.g., any of the computing code described herein), code generation heuristic data 314 representative of one or more code generation heuristics, and graphics data 316 representative of one or more graphical elements. Storage facility 308 may be configured to maintain additional and/or alternative data as may suit a particular implementation.

Distribution subsystem 106 may be configured to provide a developer with access to computing code, streamlined graphics data, and/or any other data exported by export subsystem 104. Distribution subsystem 106 may be configured to provide the access in any suitable way. For example, distribution subsystem 106 may include one or more staging servers and/or one or more data repositories that may be accessed by a developer. Additionally or alternatively, distribution subsystem 106 may be configured to provide a notification service configured to notify a developer of exported data (e.g., by sending a notification email to the developer).

In certain implementations, distribution subsystem 106 may include a designer repository configured to maintain exported data and a developer repository (e.g., a version control repository) synchronized to include the same data as the designer repository. In such a configuration, export subsystem 104 may export data to the designer repository, which may store the data and automatically communicate with the developer repository such as by providing one or more updates for use by the developer repository to update data in the developer repository to match the data in the designer repository. In certain examples, the synchronized repositories may be configured to store data in matching directory data structures, which may further automate development of computing code, as described further below.

The data exported by export subsystem 104 and made available to a developer by distribution subsystem 106 may be in a form that is beneficial to the developer. For example, rather than having to manually produce computing code for a GUI screen based on a GUI screen design as required in conventional GUI design and development processes, a developer with access to data exported by export subsystem 104 may conveniently insert, or otherwise make reference to, exported computing code, such as by copying and pasting the pre-generated computing code, into code being produced by the developer or into another appropriate location for processing by a target computing device. This may be done by the developer because the computing code exported by export subsystem 104 is configured to be processed by a target computing device to render a GUI screen. Consequently, the developer is able to produce code for rendering a GUI screen more efficiently and with fewer opportunities for error when compared to conventional GUI design and development processes.

An exemplary implementation and exemplary operations of system 100 will now be described. In an exemplary implementation, design subsystem 102 may include a vector graphics design tool and a bitmap graphics design tool, such as Adobe Illustrator and Adobe Photoshop, for example. Export subsystem 104 may be configured to interface with the vector and bitmap graphics design tools.

A designer may interact with the vector graphics design tool to define a GUI screen design, such as GUI screen design 200 shown in FIG. 2. Each graphical element in the GUI screen design may correspond to a logical construct known as a layer in the GUI screen design. The vector graphics design tool may maintain and present data representative of the layers in the GUI screen design. For example, FIG. 4 illustrates an ordered list 400 of layers associated with GUI screen design 200. The order of the layers in list 400 may represent an order in which the layers are layered in GUI screen design 200. List 400 may also specify information about the layers. For example, row 402-1 in list 400 may represent a layer corresponding to a particular graphical element included in GUI screen design 200. Row 402-1 may include a thumbnail image 404-1 of the graphical element, a layer name 406-1 (e.g., "left arrow"), and/or any other information related to the graphical element.

A designer may define layer names. In certain examples, export subsystem 104 may be configured to perform or to refrain from performing one or more operations in response to and/or based on in-line commands included in layer names. Accordingly, a designer who has knowledge of the capabilities of export subsystem 104 may define layer names to include in-line commands to cause export subsystem 104 to perform or refrain from performing operations on certain layers. To illustrate, row 402-2 in list 400 may represent a layer corresponding to instructions defined by a designer for use by a developer. A layer name 406-2 for the layer may include an in-line command (e.g., "-X") that is configured to direct export subsystem 104 to refrain from performing one or more operations (e.g., rasterizing, exporting, etc.) on the instructions layer. Other in-line commands may be used. For example, in-line commands may be configured to indicate if a graphical element is to be stretched horizontally in width (e.g., a "-w" command) or vertically in height (e.g., a "H" command). As another example, in-line commands may be employed to indicate a class or type of graphical element associated with a layer, such as whether the graphical element is a text-type, graphics-type, or complex-type (including both text and graphics) graphical element, or whether the graphical element is a button (e.g., "-btn") type element or another type of element. Export subsystem 104 may be configured to detect and utilize in-line commands included in layer names to direct processing of graphical elements, including in any of the ways described herein.

In certain implementations, export subsystem 104 may be configured to process one or more value-add type layers that a designer may add to a GUI screen design. For example, a designer may add an instructions layer that includes text instructing a developer concerning the desired functionality of the GUI screen. Export subsystem 104 may be configured to save an instructions layer to a file that may be exported for distribution to the developer. As another example, a designer may add a commands and classes layer that defines classes for one or more layers included in the GUI screen design and associated the classes with the names of the layers. For example, the layer may define whether a layer is a text or button class layer. The layer may further define, for each layer, a set of operations that are to be performed in response to occurrences of one or more events associated with the layer. As an example, in response to a button selection, a particular subroutine may be called. As another example, the layer may specify how a graphical element is to be animated when the GUI screen is rendered or closed. Export subsystem 104 may be configured to consider data included in such a commands and classes layer and to incorporate the commands and/or classes into computing code exported by export subsystem 104.

When the designer is finished defining the GUI screen design in the vector graphics design tool, the designer may provide input, such as a single selection of an export command, to initiate processing by export subsystem 104 to generate and export computing code and/or streamlined graphical elements for the GUI screen design. In response to the user input, export subsystem 104 may automatically perform one or more of the operations described herein to generate and export computing code and/or streamlined graphical elements for the GUI screen design. In some examples, no additional designer input is needed, and the export subsystem 104 automatically performs one or more of the operations described herein to generate and export computing code and/or streamlined graphical elements for the GUI screen design for access by a developer.

Export subsystem 104 may begin an exemplary export process by generating an overall reference screen of the GUI screen design. For example, export subsystem 104 may interface with the vector graphics design tool and instruct the tool to generate and export an overall reference screen for the GUI screen design. The overall reference screen may be exported in any suitable format, such as in a lossless or lossy bitmap format (e.g., as one or more Portable Network Graphics ("PNG") files). Export subsystem 104 may be configured to export data representative of the overall reference screen for distribution to a developer such that the developer may be able to use the overall reference screen as a reference if desired.

As part of the exemplary export process, export subsystem 104 may access and store information descriptive of or otherwise related to the GUI screen design. For example, export subsystem 104 may interface with the vector graphics design tool to determine and store data representative of screen dimensions within which the GUI screen design is to be displayed. For instance, export subsystem 104 may determine that GUI screen design is associated with screen dimensions of 1024×768 pixels, or any other screen dimensions. Export subsystem 104 may also interface with the vector graphics design tool to determine and store layer names and/or the order of the layers in the GUI screen design. In some examples, both the original layer names and the layer names without in-line commands (layer names with in-line commands removed) may be stored. Export subsystem 104 may be configured to interface with the vector graphics design tool to determine and store any other information about the GUI screen design.

As part of the exemplary export process, export subsystem 104 may generate a reference graphical element having dimensions substantially equal to the determined screen dimensions associated with the GUI screen design. In certain examples, the reference graphical element may include a black rectangle having dimensions equal to the screen dimensions. Export subsystem 104 may interface with the vector graphics design tool to instruct the vector graphics design tool to generate the reference graphical element in a new layer. FIG. 5 illustrates a row 502 representing a reference layer that corresponds to the reference rectangle and has been added to the list 400 of layers included in the GUI screen design. As described herein, export subsystem 104 may be configured to utilize the reference graphics element to normalize graphics position data (e.g., by compensating for any differences in x-axis and/or y-axis positions and/or directions in the vector graphics design tool) and/or to remove extraneous pixel data.

As part of the exemplary export process, export subsystem 104 may process each layer individually. For example, export subsystem 104 may interface with the vector graphics design tool to step through the list 400 of layers to individually process each layer in the list 400. In some examples, export subsystem 104 may instruct the vector graphics design tool to turn off all layers in the list 400 except for the individual layer to be processed and the newly added reference layer. FIG. 5 illustrates indicators 504-1 and 504-2 visually indicating that a reference layer (named "Reference document t size rect") and another particular layer (named "right arrow") are turned on for processing by export subsystem 104. All other layers in the list 400 are turned off such that the "right arrow" layer may be processed individually with reference to the reference layer.

Export subsystem 104 may then process the individual layer in reference to the reference layer. The processing of the individual layer may include accessing and storing any vector graphics information about the individual layer or the graphical element corresponding to the individual layer. For example, if the individual layer includes text, export subsystem 104 may access and store vector-based text data associated with the text in the layer and/or in-line commands included in the name of the layer.

The processing of the turned-on individual layer with reference to the reference layer may further include rasterizing the individual layer and the reference layer from two vector-based images to a two-layer bitmap image. The rasterization may be performed in any suitable way. For example, export subsystem 104 may interface with the vector graphics design tool to instruct the vector graphics design tool to use native capabilities to rasterize the individual layer and the reference layer from two vector-based images to a two-layer bitmap image and to export the two-layer bitmap image. The exported bitmap image may be in any suitable bitmap format such as Adobe Photoshop data ("PSD") image format.

The exported bitmap image may include any data associated with the graphical element corresponding to the rasterized individual layer. For example, the bitmap image may include data specifying a position of the graphical element from a reference position (e.g., an offset from a reference position such as a top left coordinate of a screen).

As part of the exemplary export process, after bitmap images have been generated and exported for each layer in the list 400 of layers, export subsystem 104 may remove the reference layer from the GUI screen design in the vector graphics design tool. For example, export subsystem 104 may instruct the vector graphics design tool to delete the reference layer from the GUI screen design. By doing this, export subsystem 104 causes the GUI screen design to be returned to the state of the GUI screen design before the export process began.

As part of the exemplary export process, export subsystem 104 may individually process each exported bitmap image to form a streamlined bitmap image. For example, for each exported bitmap image, export subsystem 104 may trim the image to the border of the reference graphical element. The trimming may include selecting a region and is equal to the dimensions of the reference graphical element (e.g., a reference rectangle having dimensions equal to screen dimensions) and removing extraneous data associated with pixels of the graphical element that are positioned outside of the region. The trimming may be performed in any suitable way, including by export subsystem 104 interfacing with a bitmap graphics design or editing tool and/or with a bitmap image trimming tool. After the image has been trimmed to the border of the region defined by the reference graphical element, the reference graphical element may be deactivated such as by removing the reference graphical element from the bitmap image or setting the reference graphical element to be invisible in the bitmap image.

For each exported bitmap image, export subsystem 104 may also trim the image to the bounds of the dimensions of the graphical element in the bitmap image. For example, the image may be trimmed by export subsystem 104 determining the dimensions of the actual graphical element within the bitmap image and removing extraneous data associated with pixels positioned outside of the bounds of the dimensions of the graphical element. The determining of the bounds of the graphical element and the trimming may be performed in any suitable way, including by export subsystem 104 interfacing with a bitmap graphics design or editing tool and/or with a bitmap image trimming tool.

In certain examples, the trimming described above may include removing extraneous data associated with one or more transparent pixels (e.g., fully transparent pixels) from the bitmap image. For example, a bitmap image may include transparent pixels surrounding the pixels of the actual graphical element. The transparent pixels may be used to determine the bounds of non-transparent pixels associated with the graphical element, and the extraneous data associated with the transparent pixels may be removed to further streamline the bitmap image.

In certain examples, export subsystem 104 may be configured to employ one or more safeguards to preserve transparent pixels that may be part of the graphical element. For example, export subsystem 104 may be configured to provide a buffer area for a graphical element that includes text or an icon. Data associated with pixels within the buffer area may be kept in the bitmap image, even if the pixels are transparent.

As mentioned above, export subsystem 104 may determine the bounds of the dimensions of an actual graphical element within a bitmap image. The bounds may be defined to encompass pixel data associated with the graphical element, which may typically be data associated with pixels that are not fully transparent. In certain implementations, the bounds may be defined as the top, left, right, and bottom boundaries of the graphical element. In certain implementations, the bounds may additionally or alternatively be defined by the height and width of the graphical element. Using the determined bounds, export subsystem 104 may store the bitmap images position data (e.g., coordinates, width, height, offset from reference position, and any other position data). This may contribute to the normalization of the position data of the graphical element described above.

As part of the exemplary export process, export subsystem 104 may be configured to further process the bitmap image based on any stored in-line commands associated with the graphical element layer represented by the bitmap image. For example, for a bitmap image, export subsystem 104 may determine, from data accessed and stored earlier in the export process, whether any in-line commands are associated with the bitmap image (e.g., whether any in-line commands were included in the original layer name associated with the bitmap image). If an in-line command is associated with the bitmap image, export subsystem 104 may further process the bitmap image based on the in-line command. Such processing may further streamline the bitmap image.

To illustrate, a bitmap image may represent a graphical element that, as indicated in the layer name of the layer corresponding to the graphical element, is to be stretched horizontally to expand the width of the graphical element when rendered. Based on this width-wise stretch command, export subsystem 104 may infer that a vertical slice of the graphical element may be used to represent the graphical element. Accordingly, export subsystem 104 may select a vertical slice of the graphical element and modify the bitmap image to represent only the vertical slice of the graphical element instead of the entire graphical element. The in-line command to horizontally stretch the bitmap image may be associated with the bitmap image such that export subsystem 104 may generate appropriate computing code to be executed by a target computing device to render the graphical element associated with the bitmap image.

As part of the exemplary export process, export subsystem 104 may save each streamlined bitmap image in a desired format (e.g., in PNG format). In certain examples, after all bitmap images for the GUI screen design have been saved, export subsystem 104 may name or rename each streamlined bitmap image to the layer name associated with the graphical element in the bitmap image without including any in-line commands in the name of the streamlined bitmap image.

As part of the exemplary export process, export subsystem 104 may generate abstraction data for the saved bitmap images associated with the GUI screen design. The abstraction data may be in any format that is suitable for use by export subsystem 104 to generate computing code based on the abstraction data.

As an example, Table 1 shown below depicts an exemplary abstraction data entry for a graphical element (e.g., for a streamlined bitmap image representing the graphical element). As depicted in Table 1, abstraction data for the graphical element may indicate a left value (e.g., "0"), top value (e.g., "0"), right value (e.g., "100"), and bottom value (e.g., "200") for the graphical element, as well as offset values for an offset from a reference position (e.g., an offset in the x-dimension (e.g., "0") and an offset in the y-dimension (e.g., "10")). In Table 1, the abstraction data also includes a name (e.g., "Button") for the graphical element. The abstraction data may include any suitable additional or alternative information, such as height and width values for the graphical element and/or text information if the graphical element includes text.

TABLE 1

[ left: 0, top: 0, right: 100, bottom: 200, referenceXOffset:0, referenceYOffset:10, name:"Button" ]

Abstraction data for the GUI screen design may include one or more lists (e.g., a key-value list) or other data structures including abstraction data entries for each graphical element (e.g., streamlined bitmap image representing the graphical element) included in the GUI screen design. The data included in the abstraction data entries is normalized such that the data may be reliably used to generate computing code that supports pixel-perfect rendering of a GUI screen in accordance with the GUI screen design. For example, the position data in each abstraction data entry may be normalized such that the position data for each graphical element may be consistent and reliable.

The example shown in Table 1 is illustrative only. Any other suitable data format and software data structure may be used to represent abstraction data for a GUI screen design and/or one or more graphical elements included in the GUI screen design.

As part of the exemplary export process, export subsystem 104 may generate computing code configured to be processed by one or more target computing devices to render GUI screens in accordance with the GUI screen design. Export subsystem 104 may generate the computing code based on the abstraction data. For example, export subsystem 104 may step through each entry in the abstraction data and utilize the position data, name data, and any other data in each entry to generate the computing code. In certain examples, the computing code may reference the streamlined bitmap images described above to allow the one or more target computing devices to render the corresponding graphical elements in the GUI screens.

As mentioned, export subsystem 104 may be configured to generate computing code in multiple different languages for multiple different computing platforms. In certain implementations, for example, export subsystem 104 may be configured to generate computing code in accordance with one or more of the following programming languages and/or data structures: Lua, Structured Lua, STB C, Javascript, HTML, XML, Playstation 3 XML, Javascript Object Notation ("JSON"), CSV, tab delimited, colon delimited, and Cascading Style Sheets ("CSS") files.

Table 2 below illustrates exemplary computing code that may be generated by export subsystem 104 in a programming language known as Lua. The computing code in Table 2 is configured to be processed by a target computing device having an appropriate computing platform capable of processing Lua code to render a GUI screen. As depicted in Table 2, the computing code references streamlined bitmap image files (e.g., PNG files) corresponding with the layers in list 400 of FIG. 4, which image files may be referenced and used to render the GUI screen when the Lua code is executed.

TABLE 2

Automation Script Output
Screen Layout Information For: sd modes minimal
Rect: 0.0, 0.0, 704.0, 480.0
---- Global Constants
left_arrow = "left arrow.png"
right_arrow = "right arrow.png"
list_slot_3_selected = "list slot 3 selected.png"
slug_up = "slug up.png"
slug_down = "slug down.png"
txt_header = "txt header.png"
header_left = "header left.png"
header_mid = "header mid.png"
mag_selected = "mag selected.png"
Live_TV = "Live TV.png"
shadow_right = "shadow right.png"
txt_counter = "txt counter.png"
mode_bg_right = "mode bg right.png"
mode_bg_mid = "mode bg mid.png"
mode_bg_left = "mode bg left.png"
Mode_Bg_Left_Shadow = "Mode Bg Left Shadow.png"
---- Text Specifics
Name: list slot 3 selected
Location: 526, 241
Text: Option
Size: 20.0

TABLE 2-continued

Color: 0xFF2A2E33
Name: txt header
Location: 474, 37
Text: Modes
Size: 22.0
Color: 0xFFB0B0B0
Name: Live TV
Location: 474, 225
Text: Live TV
Size: 18.0
Color: 0xFF303030
Name: txt counter
Location: 481, 139
Text: 1
Size: 16.0
Color: 0xFF2A2E33
---- PNG draw code
    xOffset = 0
    yOffset = 0
-- Mode Bg Left Shadow
    myFileName = "Mode Bg Left Shadow.png"
    myURL = gRootURL .. myFileName
    myLeft = 449
    myTop = 0
    myWidth = 55
    myHeight = 480
    -- myRect = 449.0, 0.0, 504.0, 480.0
    imgdata={ }
    err, imgdata.len, imgdata.data = Network.HTTPGetFile(myURL)
    err = Graphics.DrawImage(g_Window_Attribute,
g_Window_Handle, imgdata.data, imgdata.len, myLeft − xOffset,
myTop − yOffset, myWidth, myHeight, 64)
-- mode bg left
    myFileName = "mode bg left.png"
    myURL = gRootURL .. myFileName
    myLeft = 461
    myTop = 0
    myWidth = 44
    myHeight = 480
    -- myRect = 461.0, 0.0, 505.0, 480.0
    imgdata={ }
    err, imgdata.len, imgdata.data = Network.HTTPGetFile(myURL)
    err = Graphics.DrawImage(g_Window_Attribute,
g_Window_Handle, imgdata.data, imgdata.len, myLeft − xOffset,
myTop − yOffset, myWidth, myHeight, 64)
-- mode bg mid
    myFileName = "mode bg mid.png"
    myURL = gRootURL .. myFileName
    myLeft = 504
    myTop = 0
    myWidth = 170
    myHeight = 480
    -- myRect = 504.0, 0.0, 674.0, 480.0
    imgdata={ }
    err, imgdata.len, imgdata.data = Network.HTTPGetFile(myURL)
    err = Graphics.DrawImage(g_Window_Attribute,
g_Window_Handle, imgdata.data, imgdata.len, myLeft − xOffset,
myTop − yOffset, myWidth, myHeight, 64)
-- mode bg right
    myFileName = "mode bg right.png"
    myURL = gRootURL .. myFileName
    myLeft = 674
    myTop = 0
    myWidth = 30
    myHeight = 480
    -- myRect = 674.0, 0.0, 704.0, 480.0
    imgdata={ }
    err, imgdata.len, imgdata.data = Network.HTTPGetFile(myURL)
    err = Graphics.DrawImage(g_Window_Attribute,
g_Window_Handle, imgdata.data, imgdata.len, myLeft − xOffset,
myTop − yOffset, myWidth, myHeight, 64)
-- txt counter
    myFileName = "txt counter.png"
    myURL = gRootURL .. myFileName
    myLeft = 481
    myTop = 142
    myWidth = 6
    myHeight = 11
    -- myRect = 481.0, 142.0, 487.0, 153.0
    imgdata={ }

TABLE 2-continued

```
        err, imgdata.len, imgdata.data = Network.HTTPGetFile(myURL)
        err = Graphics.DrawImage(g__Window__Attribute,
g__Window__Handle, imgdata.data, imgdata.len, myLeft − xOffset,
myTop − yOffset, myWidth, myHeight, 64)
-- shadow right
        myFileName = "shadow right.png"
        myURL = gRootURL .. myFileName
        myLeft = 674
        myTop = 0
        myWidth = 10
        myHeight = 480
        -- myRect = 674.0, 0.0, 684.0, 480.0
        imgdata={ }
        err, imgdata.len, imgdata.data = Network.HTTPGetFile(myURL)
        err = Graphics.DrawImage(g__Window__Attribute,
g__Window__Handle, imgdata.data, imgdata.len, myLeft − xOffset,
myTop − yOffset, myWidth, myHeight, 64)
-- Live TV
        myFileName = "Live TV.png"
        myURL = gRootURL .. myFileName
        myLeft = 475
        myTop = 225
        myWidth = 15
        myHeight = 55
        -- myRect = 475.0, 225.0, 490.0, 280.0
        imgdata={ }
        err, imgdata.len, imgdata.data = Network.HTTPGetFile(myURL)
        err = Graphics.DrawImage(g__Window__Attribute,
g__Window__Handle, imgdata.data, imgdata.len, myLeft − xOffset,
myTop − yOffset, myWidth, myHeight, 64)
-- mag selected
        myFileName = "mag selected.png"
        myURL = gRootURL .. myFileName
        myLeft = 492
        myTop = 221
        myWidth = 194
        myHeight = 63
        -- myRect = 492.0, 221.0, 686.0, 284.0
        imgdata={ }
        err, imgdata.len, imgdata.data = Network.HTTPGetFile(myURL)
        err = Graphics.DrawImage(g__Window__Attribute,
g__Window__Handle, imgdata.data, imgdata.len, myLeft − xOffset,
myTop − yOffset, myWidth, myHeight, 64)
-- header mid
        myFileName = "header mid.png"
        myURL = gRootURL .. myFileName
        myLeft = 474
        myTop = 0
        myWidth = 230
        myHeight = 74
        -- myRect = 474.0, 0.0, 704.0, 74.0
        imgdata={ }
        err, imgdata.len, imgdata.data = Network.HTTPGetFile(myURL)
        err = Graphics.DrawImage(g__Window__Attribute,
g__Window__Handle, imgdata.data, imgdata.len, myLeft − xOffset,
myTop − yOffset, myWidth, myHeight, 64)
-- header left
        myFileName = "header left.png"
        myURL = gRootURL .. myFileName
        myLeft = 456
        myTop = 0
        myWidth = 18
        myHeight = 73
        -- myRect = 456.0, 0.0, 474.0, 73.0
        imgdata={ }
        err, imgdata.len, imgdata.data = Network.HTTPGetFile(myURL)
        err = Graphics.DrawImage(g__Window__Attribute,
g__Window__Handle, imgdata.data, imgdata.len, myLeft − xOffset,
myTop − yOffset, myWidth, myHeight, 64)
-- txt header
        myFileName = "txt header.png"
        myURL = gRootURL .. myFileName
        myLeft = 475
        myTop = 39
        myWidth = 64
        myHeight = 18
        -- myRect = 475.0, 39.0, 539.0, 57.0
        imgdata={ }
        err, imgdata.len, imgdata.data = Network.HTTPGetFile(myURL)
        err = Graphics.DrawImage(g__Window__Attribute,
g__Window__Handle, imgdata.data, imgdata.len, myLeft − xOffset,
myTop − yOffset, myWidth, myHeight, 64)
-- slug down
        myFileName = "slug down.png"
        myURL = gRootURL .. myFileName
        myLeft = 638
        myTop = 412
        myWidth = 38
        myHeight = 28
        -- myRect = 638.0, 412.0, 676.0, 440.0
        imgdata={ }
        err, imgdata.len, imgdata.data = Network.HTTPGetFile(myURL)
        err = Graphics.DrawImage(g__Window__Attribute,
g__Window__Handle, imgdata.data, imgdata.len, myLeft − xOffset,
myTop − yOffset, myWidth, myHeight, 64)
-- slug up
        myFileName = "slug up.png"
        myURL = gRootURL .. myFileName
        myLeft = 638
        myTop = 69
        myWidth = 38
        myHeight = 28
        -- myRect = 638.0, 69.0, 676.0, 97.0
        imgdata={ }
        err, imgdata.len, imgdata.data = Network.HTTPGetFile(myURL)
        err = Graphics.DrawImage(g__Window__Attribute,
g__Window__Handle, imgdata.data, imgdata.len, myLeft − xOffset,
myTop − yOffset, myWidth, myHeight, 64)
-- list slot 3 selected
        myFileName = "list slot 3 selected.png"
        myURL = gRootURL .. myFileName
        myLeft = 526
        myTop = 243
        myWidth = 61
        myHeight = 20
        -- myRect = 526.0, 243.0, 587.0, 263.0
        imgdata={ }
        err, imgdata.len, imgdata.data = Network.HTTPGetFile(myURL)
        err = Graphics.DrawImage(g__Window__Attribute,
g__Window__Handle, imgdata.data, imgdata.len, myLeft − xOffset,
myTop − yOffset, myWidth, myHeight, 64)
-- right arrow
        myFileName = "right arrow.png"
        myURL = gRootURL .. myFileName
        myLeft = 656
        myTop = 240
        myWidth = 20
        myHeight = 24
        -- myRect = 656.0, 240.0, 676.0, 264.0
        imgdata={ }
        err, imgdata.len, imgdata.data = Network.HTTPGetFile(myURL)
        err = Graphics.DrawImage(g__Window__Attribute,
g__Window__Handle, imgdata.data, imgdata.len, myLeft − xOffset,
myTop − yOffset, myWidth, myHeight, 64)
-- left arrow
        myFileName = "left arrow.png"
        myURL = gRootURL .. myFileName
        myLeft = 503
        myTop = 240
        myWidth = 20
        myHeight = 24
        -- myRect = 503.0, 240.0, 523.0, 264.0
        imgdata={ }
        err, imgdata.len, imgdata.data = Network.HTTPGetFile(myURL)
        err = Graphics.DrawImage(g__Window__Attribute,
g__Window__Handle, imgdata.data, imgdata.len, myLeft − xOffset,
myTop − yOffset, myWidth, myHeight, 64)
```

Table 3 below illustrates exemplary computing code that may be generated by export subsystem 104 in a data structure known as Playstation 3 XML. The computing code in Table 3 is configured to be processed by a target computing device having an appropriate computing platform capable of parsing a Playstation 3 XML data structure to render a GUI screen.

TABLE 3

```
<xmlapp name="sd modes minimal">
<visible>true</visible>
<left>0</left>
<top>0</top>
<posz>0</posz>
<width>704</width>
<height>480</height>
<control type="image">
<name>"Mode Bg Left Shadow"</name>
        <left>449</left>
        <top>0</top>
        <width>55</width>
        <height>480</height>
        <bitmapid>00000</bitmapid>
        <source>file:/resource/images/sd modes minimal/Mode Bg Left Shadow.png</source>
</control>
<control type="image">
<name>"mode bg left"</name>
        <left>461</left>
        <top>0</top>
        <width>44</width>
        <height>480</height>
        <bitmapid>00000</bitmapid>
        <source>file:/resource/images/sd modes minimal/mode bg left.png</source>
</control>
<control type="image">
<name>"mode bg mid"</name>
        <left>504</left>
        <top>0</top>
        <width>170</width>
        <height>480</height>
        <bitmapid>00000</bitmapid>
        <source>file:/resource/images/sd modes minimal/mode bg mid.png</source>
</control>
<control type="image">
<name>"mode bg right"</name>
        <left>674</left>
        <top>0</top>
        <width>30</width>
        <height>480</height>
        <bitmapid>00000</bitmapid>
        <source>file:/resource/images/sd modes minimal/mode bg right.png</source>
</control>
<control type="image">
<name>"txt counter"</name>
        <left>481</left>
        <top>142</top>
        <width>6</width>
        <height>11</height>
        <bitmapid>00000</bitmapid>
        <source>file:/resource/images/sd modes minimal/txt counter.png</source>
</control>
<control type="image">
<name>"shadow right"</name>
        <left>674</left>
        <top>0</top>
        <width>10</width>
        <height>480</height>
        <bitmapid>00000</bitmapid>
        <source>file:/resource/images/sd modes minimal/shadow right.png</source>
</control>
<control type="image">
<name>"Live TV"</name>
        <left>475</left>
        <top>225</top>
        <width>15</width>
        <height>55</height>
        <bitmapid>00000</bitmapid>
        <source>file:/resource/images/sd modes minimal/Live TV.png</source>
</control>
<control type="image">
<name>"mag selected"</name>
        <left>492</left>
        <top>221</top>
        <width>194</width>
        <height>63</height>
        <bitmapid>00000</bitmapid>
        <source>file:/resource/images/sd modes minimal/mag selected.png</source>
</control>
<control type="image">
<name>"header mid"</name>
        <left>474</left>
        <top>0</top>
        <width>230</width>
        <height>74</height>
        <bitmapid>00000</bitmapid>
        <source>file:/resource/images/sd modes minimal/header mid.png</source>
</control>
<control type="image">
<name>"header left"</name>
        <left>456</left>
        <top>0</top>
        <width>18</width>
        <height>73</height>
        <bitmapid>00000</bitmapid>
        <source>file:/resource/images/sd modes minimal/header left.png</source>
</control>
<control type="image">
<name>"txt header"</name>
        <left>475</left>
        <top>39</top>
        <width>64</width>
        <height>18</height>
        <bitmapid>00000</bitmapid>
        <source>file:/resource/images/sd modes minimal/txt header.png</source>
</control>
<control type="image">
<name>"slug down"</name>
        <left>638</left>
        <top>412</top>
        <width>38</width>
        <height>28</height>
        <bitmapid>00000</bitmapid>
        <source>file:/resource/images/sd modes minimal/slug down.png</source>
</control>
<control type="image">
<name>"slug up"</name>
        <left>638</left>
        <top>69</top>
        <width>38</width>
        <height>28</height>
        <bitmapid>00000</bitmapid>
        <source>file:/resource/images/sd modes minimal/slug up.png</source>
</control>
<control type="image">
<name>"list slot 3 selected"</name>
        <left>526</left>
        <top>243</top>
        <width>61</width>
        <height>20</height>
        <bitmapid>00000</bitmapid>
        <source>file:/resource/images/sd modes minimal/list slot 3 selected.png</source>
</control>
<control type="image">
<name>"right arrow"</name>
        <left>656</left>
        <top>240</top>
        <width>20</width>
        <height>24</height>
        <bitmapid>00000</bitmapid>
        <source>file:/resource/images/sd modes minimal/right arrow.png</source>
</control>
<control type="image">
<name>"left arrow"</name>
        <left>503</left>
```

TABLE 3-continued

```
    <top>240</top>
    <width>20</width>
    <height>24</height>
    <bitmapid>00000</bitmapid>
    <source>file:/resource/images/sd modes minimal/left
arrow.png</source>
  </control>
</xmlapp>
```

Table 4 below illustrates exemplary computing code that may be generated by export subsystem 104 in a CSV data structure. The computing code in Table 4 is configured to be processed by a target computing device having an appropriate computing platform capable of parsing a CSV data structure to render a GUI screen.

TABLE 4

```
width, 704
height, 480
name, "Mode Bg Left Shadow"
left, 449
top, 0
width, 55
height, 480
name, "mode bg left"
left, 461
top, 0
width, 44
height, 480
name, "mode bg mid"
left, 504
top, 0
width, 170
height, 480
name, "mode bg right"
left, 674
top, 0
width, 30
height, 480
name, "txt counter"
left, 481
top, 142
width, 6
height, 11
name, "shadow right"
left, 674
top, 0
width, 10
height, 480
name, "Live TV"
left, 475
top, 225
width, 15
height, 55
name, "mag selected"
left, 492
top, 221
width, 194
height, 63
name, "header mid"
left, 474
top, 0
width, 230
height, 74
name, "header left"
left, 456
top, 0
width, 18
height, 73
name, "txt header"
left, 475
top, 39
width, 64
height, 18
name, "slug down"
left, 638
```

TABLE 4-continued

```
top, 412
width, 38
height, 28
name, "slug up"
left, 638
top, 69
width, 38
height, 28
name, "list slot 3 selected"
left, 526
top, 243
width, 61
height, 20
name, "right arrow"
left, 656
top, 240
width, 20
height, 24
name, "left arrow"
left, 503
top, 240
width, 20
height, 24
```

The examples of computing code depicted in Tables 2-4 are illustrative only. Other instances of computing code in additional or alternative programming languages or data structures may be generated by export subsystem 104 as may suit a particular implementation. The generated computing code may be saved by export subsystem 104 to any suitable data structure, including in one or more files such as text files or rich text format ("RTF") files.

As part of the exemplary export process, in certain implementations, export subsystem 104 may be further configured to optimize streamlined graphical elements (e.g., streamlined bitmap images) generated by export subsystem 104. For example, export subsystem 104 may queue up each streamlined graphical element to be subjected to an optimization routine. The optimization routine may be configured to optimize each streamlined graphical element in any of the ways described in U.S. Patent Application Ser. No. 12/1983,101, entitled IMAGE DATA OPTIMIZATION SYSTEMS AND METHODS, and filed concurrently herewith, the contents of which are hereby incorporated by reference.

As part of the exemplary export process, export subsystem 104 may be configured to export data representative of the generated computing code and/or streamlined bitmap images to distribution subsystem 106 for distribution to and access by a developer, as described above. A developer may conveniently access and utilize data exported by export subsystem 104 to produce code that may be processed by one or more target devices to render GUI screens in accordance with a GUI screen design. For example, as mentioned above, a developer with access to data exported by export subsystem 104 may conveniently insert, or otherwise make reference to, exported computing code, such as by copying and pasting the computing code, into code being produced by the developer or into another appropriate location.

In certain examples, a developer may use exported computing code without making more than only minimal changes to the computing code. For example, the developer may be able to simply declare a root variable (e.g., the "gRootURL" variable shown in the computing code in Table 2) to indicate a path where exported graphical element files (e.g., bitmap image files) may be accessed. The path information may be provided to the developer by distribution subsystem 106 in any suitable way, including by email or other suitable communication.

In other examples, a developer may use exported computing code without making any changes to the computing code. For example, export subsystem 104 may automatically declare a value for a root variable (e.g., the "gRootURL" variable shown in the computing code in Table 2) to indicate a path where exported graphical element files (e.g., bitmap image files) may be accessed. To facilitate this capability, export subsystem 104 may be aware of where exported graphical element files are stored and may use the store path to determine and include the root path in the computing code. In addition, export subsystem 104 may store the exported graphical element files within data store having a directory structure that matches the directory structure of the data store used by the developer. As mentioned above, for example, distribution subsystem 106 may include a designer repository and a developer repository synchronized to include the same data as the designer repository. The matching directory structures may allow the path specified by a root variable in the exported computing code may be valid for both the repositories, including the developer repository used by the developer and access by the computing code.

Exported data may provide a developer with flexibility as to how graphical elements may be rendered. For example, exported data may include data that may be used to render text as text or as bitmap images of the text. Export subsystem 104 may be configured to automatically generate computing code configured to be processed to render text as text or as bitmap images of the text as dictated by a code generation heuristic.

In certain implementations, export subsystem 104 may be configured to present information descriptive of the operations and/or status of an export process. For example, during execution of an export process, information indicating which layers are active and being processed, graphical depictions of graphical images being trimmed, graphical depictions of computing code being generated, information indicating optimization rates (e.g., memory space savings), information indicating sizes of export files, information indicating elapsed processing time, and any other information descriptive of the operations and/or status of the export process may be presented to the designer. Export subsystem 104 may be configured to generate and present the information or interface with design subsystem 102 to instruct design subsystem 102 to present the information.

Export subsystem 104 may include or interface with any tools that may assist with the exemplary export operations described herein. For example, export subsystem 104 may include or interface with memory management tools (e.g., file managers, file read/write tools, Windows Explorer, etc.), text editors, file transfer services (e.g., a file server, web server, etc.), notification service (e.g., an email application), an image optimizer, and any other tool.

Figure 6:
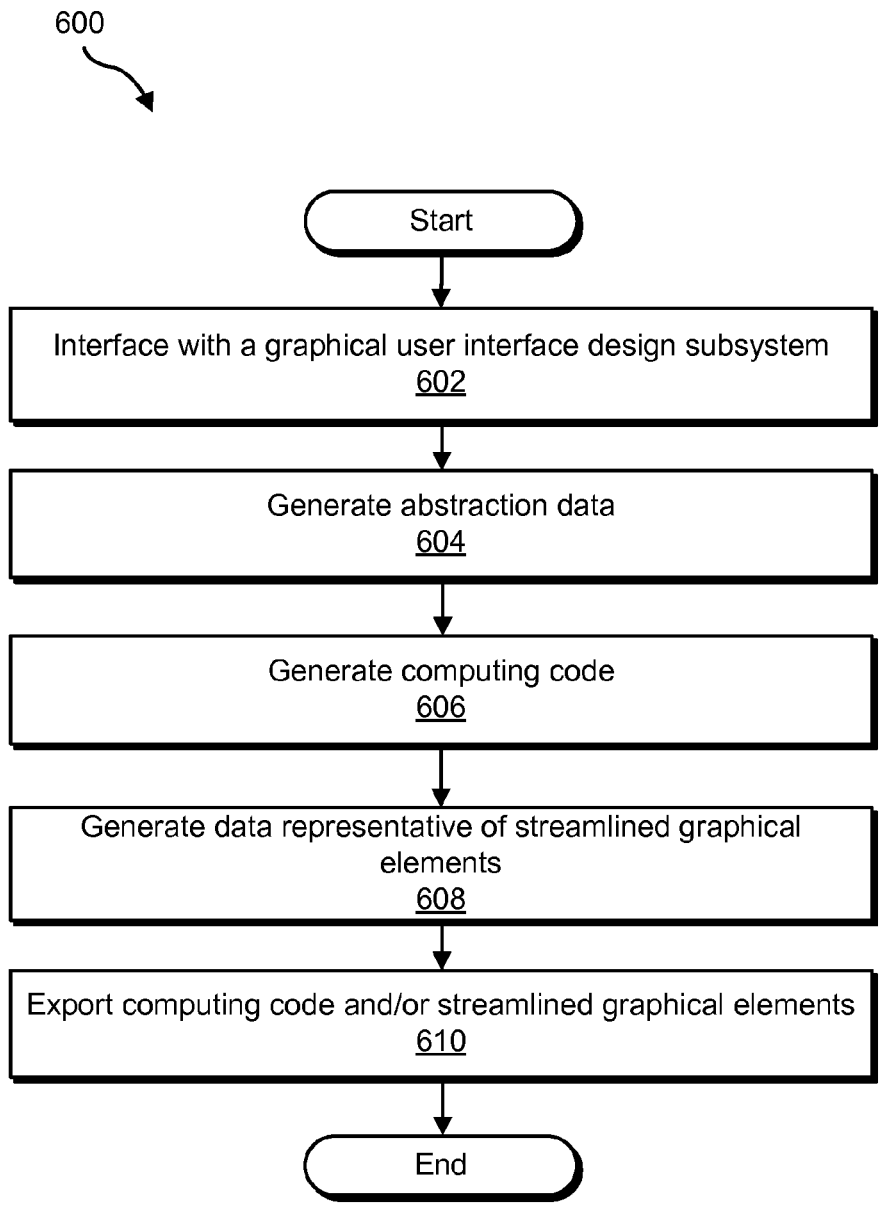
FIG. 6 illustrates an exemplary automated graphical user interface design and development method according to principles described herein.

FIG. 6 illustrates an exemplary automated GUI design and development method 600. While FIG. 6 illustrates exemplary steps according to certain embodiments, other embodiments may omit, add to, reorder, combine, and/or modify any of the steps shown in FIG. 6. The steps shown in FIG. 6 may be performed by export subsystem 104 and/or any other component(s) of system 100.

In step 602, export subsystem 104 may interface with a GUI design subsystem such as design subsystem 102. The interfacing may include accessing data representative of a GUI screen design and/or leveraging one or more capabilities of the GUI design subsystem, such as described herein.

In step 604, export subsystem 104 may generate abstraction data. The abstraction data may be generated automatically based on data representative of the GUI screen design, such as described herein.

In step 606, export subsystem 104 may generate computing code. In certain examples, the computing code may be automatically generated based on the abstraction data, such as described herein. As described above, in certain examples, export subsystem 104 may generate computing code configured to be processed by target computing devices having different computing platforms to render GUI screens in accordance with the GUI screen design.

In step 608, export subsystem 104 may generate data representative of streamlined graphical elements. The streamlined graphical elements may be automatically generated based on data representative of one or more graphical elements included in the GUI screen design, such as described herein.

In step 610, export subsystem 104 may export computing code and/or one or more streamlined graphical elements. The computing code and/or streamlined graphical elements maybe exported to distribution subsystem 106 for access by a developer, such as described herein.

In certain embodiments, one or more of the components (e.g., export subsystem 104 and/or other components of system 100) and/or processes described herein may be implemented and/or performed by one or more appropriately configured computing devices. To this end, one or more of the systems and/or components described above may include or be implemented by any computer hardware and/or computer-implemented instructions (e.g., software), or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

One or more of the processes described herein may be implemented at least in part as instructions executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Figure 7:
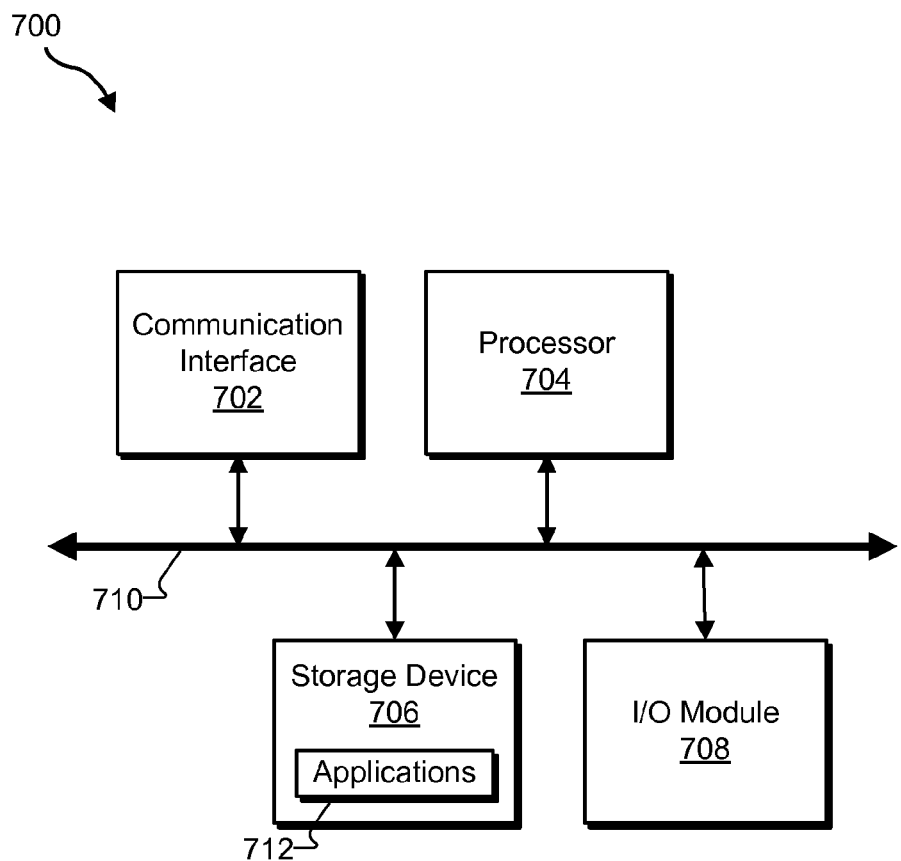
FIG. 7 illustrates an exemplary computing device according to principles described herein.

FIG. 7 illustrates an exemplary computing device 700 configured to perform one or more of the processes described herein. In certain embodiments, computing device 700 may implement export subsystem 104 and/or one or more other components of system 100. As shown in FIG. 7, computing device 700 may include a communication interface 702, a processor 704, a storage device 706, and an input/output ("I/O") module 708 communicatively connected via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, and any other suitable interface. Communication interface 702 may additionally or alternatively provide such a connection through, for example, a local area network (such as an Ethernet network), a personal area network, a telephone or cable network, a satellite data connection, a dedicated URL, or any other suitable connection. Communication interface 702 may be configured to interface with any suitable communication media, protocols, and formats, including any of those mentioned above.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may be configured to receive user input and provide user output and may include any hardware, firmware, software, or combination thereof supportive of input and output capabilities. For example, I/O module 708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 708 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 708 is configured to provide graphical data to a display for presentation to a user. The graphical data may be representative of one or more GUIs and/or any other graphical content as may serve a particular implementation.

In certain implementations, one or more facilities of export subsystem 104 may be implemented by computing device 700. For example, applications 712 may be configured to direct processor 704 to perform one or more operations of interface facility 302, abstraction facility 304, and/or exporter facility 306. Additionally or alternatively, storage facility 308 may be implemented on storage device 706.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    interfacing, by a computing device including a graphics export subsystem, with a graphical user interface design subsystem to access data representative of a graphical user interface screen design, the data representative of the graphical user interface screen design including data representative of one or more graphical elements included in the graphical user interface screen design;
    generating, by the computing device including the graphics export subsystem based on the data representative of the graphical user interface screen design, abstraction data representative of the graphical user interface screen design, wherein the generating of the abstraction data comprises normalizing graphical element position data included in the data representative of the one or more graphical elements included in the graphical user interface screen design for inclusion in the abstraction data;
    generating, by the computing device including the graphics export subsystem based on the abstraction data, computing code in a plurality of different programming languages associated with a plurality of target computing devices having different computing platforms to render graphical user interfaces, the generated computing code in the plurality of different programming languages configured to be processed by the target computing devices having the different computing platforms to render graphical user interface screens in accordance with the graphical user interface screen design; and
    exporting, by the computing device including the graphics export subsystem, the generated computing code in the plurality of different programming languages associated with the plurality of target computing devices having the different computing platforms.

2. The method of claim 1, further comprising
    generating, by the computing device based on the data representative of the one or more graphical elements included in the graphical user interface screen design, data representative of one or more streamlined graphical elements representative of the one or more graphical elements included in the graphical user interface screen design.

3. The method of claim 2, wherein the one or more streamlined graphical elements are configured for reference by the computing code when the computing code is processed by the target computing devices to render the one or more streamlined graphical elements in the graphical user interface screens in accordance with the graphical user interface screen design.

4. The method of claim 2, wherein the generating of the data representative of the one or more streamlined graphical elements includes removing extraneous data from the data representative of the one or more graphical elements to form the one or more streamlined graphical elements.

5. The method of claim 2, further comprising exporting, by the computing device, at least one of the computing code in one of the plurality of different programming languages and the one or more streamlined graphical elements to a distribution subsystem for access by a developer.

6. The method of claim 1, wherein the computing code in one of the plurality of different programming languages comprises at least one of programming code and a data structure.

7. The method of claim 1, wherein the normalized graphical element position data in the abstraction data specifies a left bound, a right bound, a top bound, and a bottom bound for each of the one or more graphical elements included in the graphical user interface screen design.

8. method of claim 1, wherein the normalized graphical element position data in the abstraction data specifies a first reference position offset along a first dimension and a second reference position offset along a second dimension.

9. The method of claim 8, wherein the first and second reference position offsets specify offsets from a normalized reference position.

10. The method of claim 1, embodied as computer-executable instructions on at least one non-transitory computer-readable medium.

11. The method of claim 4, wherein the extraneous data comprises data associated with one or more pixels positioned outside of dimensions of the one or more graphical elements.

12. The method of claim 2, wherein:
the one or more graphical elements comprise one or more vector graphics;
the method further comprises rasterizing the one or more vector graphics to one or more bitmap graphics; and
the generating of the data representative of the one or more streamlined graphical elements comprises utilizing the one or more bitmap graphics to generate one or more streamlined bitmap graphics representative of the one or more graphical elements included in the graphical user interface screen design.

13. The method of claim 4, wherein the extraneous data comprises data associated with one or more transparent pixels of the one or more graphical elements.

14. The method of claim 4, wherein the extraneous data comprises data associated with one or more pixels positioned outside of dimensions of the graphical user interface screens.

15. A method comprising:
interfacing, by a computing device including a graphics export subsystem, with a graphical user interface design subsystem to access data representative of one or more graphical elements included in a graphical user interface screen design;
generating, by the computing device including the graphics export subsystem based on the data representative of the one or more graphical elements included in the graphical user interface screen design, data representative of one or more streamlined graphical elements representative of the one or more graphical elements included in the graphical user interface screen design, wherein the generating of the data representative of one or more streamlined graphical elements comprises normalizing graphical element position data included in the data representative of the one or more graphical elements included in the graphical user interface screen design;
referencing, by the computing device including the graphics export subsystem, the data representative of the one or more streamlined graphical elements with computing code in a plurality of different programming languages associated with a plurality of target computing devices having different computing platforms to render graphical user interfaces, the computing code in the plurality of different programming languages configured to be processed by the target computing devices having the different computing platforms to render graphical user interface screens in accordance with the graphical user interface screen design; and
exporting, by the computing device including the graphics export subsystem, the computing code in the plurality of different programming languages associated with the plurality of target computing devices having the different computing platforms.

16. The method of claim 15, wherein the generating of the data representative of the one or more streamlined graphical elements further comprises removing extraneous data from the data representative of the one or more graphical elements to form the one or more streamlined graphical elements.

17. The method of claim 16, wherein the extraneous data comprises data associated with at least one of transparent pixels of the one or more graphical elements, pixels positioned outside of dimensions of a graphical user interface screen, and pixels positioned outside of dimensions of the one or more graphical elements.

18. The method of claim 15, wherein:
the one or more graphical elements comprise one or more vector graphics;
the method further comprises rasterizing the one or more vector graphics to one or more bitmap graphics; and
the generating of the data representative of the one or more streamlined graphical elements comprises utilizing the one or more bitmap graphics to generate one or more streamlined bitmap graphics representative of the one or more graphical elements included in the graphical user interface screen design.

19. The method of claim 15, further comprising:
generating, by the computing device based on the data representative of the graphical user interface screen design, abstraction data representative of the graphical user interface screen design; and
generating, by the computing device based on the abstraction data, the computing code in the plurality of different programming languages.

20. The method of claim 15, embodied as computer-executable instructions on at least one non-transitory computer-readable medium.

21. A system comprising:
at least one computing device including:
an interface facility that interfaces with a graphical user interface design subsystem to access data representative of a graphical user interface screen design, the data representative of the graphical user interface screen design including data representative of one or more graphical elements included in the graphical user interface screen design;
an abstraction facility communicatively coupled to the interface facility and that generates, based on the data representative of the graphical user interface screen design, abstraction data representative of the graphical user interface screen design, wherein the generating of the abstraction data comprises normalizing graphical element position data included in the data representative of the one or more graphical elements included in the graphical user interface screen design for inclusion in the abstraction data; and
an exporter facility communicatively coupled to the interface facility and the abstraction facility and that:
generates, based on the abstraction data, computing code in a plurality of different programming languages associated with a plurality of target computing devices having different computing platforms to render graphical user interfaces, the generated computing code in the plurality of different programming languages configured to be processed by the target computing devices having the different computing platforms to render graphical user interface screens in accordance with the graphical user interface screen design, and exports the generated computing code in the plurality of different programming languages associated with the plurality of target computing devices having the different computing platforms.

22. The system of claim 21, wherein:

the exporter facility further generates, based on the data representative of the one or more graphical elements included in the graphical user interface screen design, data representative of one or more streamlined graphical elements representative of the one or more graphical elements included in the graphical user interface screen design; and the one or more streamlined graphical elements are configured for reference by the computing code when the computing code is processed by the target computing devices to render the one or more streamlined graphical elements in the graphical user interface screens in accordance with the graphical user interface screen design.

\* \* \* \* \*